United States Patent [19]
Valdez

[11] Patent Number: 6,079,522
[45] Date of Patent: Jun. 27, 2000

[54] BICYCLE BRAKE ADAPTER

[75] Inventor: Robert Valdez, Carson, Calif.

[73] Assignee: Bear Corporation, Cerritos, Calif.

[21] Appl. No.: 09/080,036

[22] Filed: May 15, 1998

[51] Int. Cl.[7] .................................. B62L 1/06; B62L 1/02
[52] U.S. Cl. ...................................... 188/24.19; 188/24.12
[58] Field of Search ............................. 188/24.11, 24.12, 188/24.19, 12, 21, 19

[56] References Cited

U.S. PATENT DOCUMENTS

| | | | |
|---|---|---|---|
| 5,390,767 | 2/1995 | Nagano et al. | 188/24.19 |
| 5,740,889 | 4/1998 | Tsai | 188/24.19 |
| 5,743,284 | 4/1998 | Lumpkin | 188/24.12 |

*Primary Examiner*—Robert J. Oberleitner
*Assistant Examiner*—Jeffrey Woller
*Attorney, Agent, or Firm*—Charles H. Thomas

[57] ABSTRACT

A bicycle brake mechanism is provided that protects a bicycle brake lever axle from bending. The bicycle brake mechanism of the invention employs a conventional brake mounting base, brake axle, and brake lever arm on a conventional bicycle frame. However, the invention employs a brake adapter of special construction which is interposed between each brake lever arm and the brake axle upon which it is mounted to isolate the brake axle from forces tending to bend the brake axle out of axial alignment. The adapter is rigidly connected to the brake mounting base and to a retaining structure which allows the brake lever arm mounted on the brake axle to rotate and apply the bicycle brakes in a conventional manner. The structure and location of the adapter isolate the brake axle or brake boss from forces that would otherwise bend the brake axle in a plane passing through the axis of rotation of the brake lever arm.

17 Claims, 9 Drawing Sheets

BICYCLE BRAKE ADAPTER

BACKGROUND OF THE INVENTION

1. Field of the Invention

The present invention relates to an improved bicycle brake mechanism and an adapter for use on existing bicycle brakes, particularly those brakes provided as standard equipment on BMX and mountain bikes.

2. Description of the Prior Art

In conventional BMX and mountain bikes, both the front and rear bicycle wheel forks are formed with arms of tubular steel. Caliper brakes are mounted upon both arms of at least the rear bicycle wheel fork. The standard bicycle brake mounting apparatus for both BMX and mountain bikes is comprised of a brake mounting base on each arm. The brake mounting base is formed as a short, steel pedestal having a generally circular cross section secured to each fork arm and projecting in a direction parallel to the plane of the bicycle wheel located between the fork arms. The bicycle mounting bases are welded to the steel fork arms.

Each of the brake mounting bases is provided with a brake axle that projects outwardly in the form of a brake arm mounting post, also in a direction parallel to the plane of the bicycle wheel located between the fork arms. The brake axles have an outside diameter slightly smaller than that of the brake mounting bases from which they project. The brake lever arms that carry the brake pads are mounted for rotation on the brake axles. The brake lever arms each have a mounting end journaled on the brake axle and carry a brake pad at some distance from the axis of rotation of the brake lever arm about the brake axle. When tension is exerted on the brake cable, the distal ends of the brake lever arms are forced inwardly toward each other, thereby forcing the brake pads toward opposing sides of the wheel rim and bringing them into contact with the wheel rim. Friction between the brake pads and the wheel rim slows or stops the rotation of the bicycle wheel.

In conventional BMX and mountain bike construction the outer diameter of the brake axle has been standardized at 0.314 inches (about 8 millimeters). The distance of the brake pad from the axis of rotation of the brake lever arm is adjustable, but is typically in the range of between about five-eighths of an inch (about 15.9 millimeters) to about one and seven-eighths inches (about 47.6 millimeters).

Extremely large forces are developed in the application of bicycle brakes to a bicycle wheel. These large forces produce not only frictional forces that retard rotation of the bicycle wheels, but also torsional moments that act in planes containing the axes of rotation of the brake lever arms. As a consequence, a considerable moment of force is applied to the brake axle tending to deflect it out of proper alignment perpendicular to the plane of rotation of the bicycle wheel. This is visually observable and also noticeable in the sponginess or lack of responsiveness of the brake system. Sometimes the deflection is inelastic to some extent. Indeed, the problem of bent brake axles is so widespread that brake axles are manufactured as disposable components of a brake system. While bicycle brake axles could be manufactured as permanent stub axles welded to and projecting from their respective brake mounting bases, on BMX and mountain bikes they are instead often constructed as removable and replaceable components.

Specifically, in a standard brake mechanism for a BMX or mountain bike, an internally tapped axial bore is defined in each brake mounting base. The brake axle is then formed as a short, detachable post or peg having a cylindrical outer brake arm receiving surface at its distal end and male threads at its proximal end. The brake axle post is provided with a raised, integrally formed, annuler, radially outwardly projecting torque ring at the transition between its distal and proximal ends. This torque ring is typically provided with a pair of diametrically opposed wrench flats that allow the brake axle to be screwed firmly into and removed from the internally tapped bore of a brake mounting base. Alternatively, the annular torque ring may be machined to have the outer surface configuration of a hex nut. In either case a detachable brake axle of this type is known in the trade as a brake boss.

Even though conventional brake bosses are removable and replaceable, they remain susceptible to torsional bending. As a consequence, after installation a conventional brake boss is typically in use only a relatively short time before it bends in a plane passing through its axis. This leads to an imprecise application of the brakes and thus a loss of braking control by the rider.

Various attempts have been made to remedy the problem of lack of rigidity and/or bent brake bosses. However, none of these attempts have remedied the underlying design defect that results in bending of the brake boss along its length.

SUMMARY OF THE INVENTION

The present invention provides an improved bicycle brake mechanism in which the torsional bending moment that results from the application of the brake pad to a bicycle wheel is almost entirely removed from the brake axle or brake boss, and is applied instead to an adapter having a much larger diameter. The adapter is a component that surrounds a conventional brake boss and which resides in a bearing relationship against the brake mounting base. Thus, the torque resulting from the application of the bicycle brake that would otherwise bend the relatively small diameter brake boss is instead transmitted through the structure of the larger diameter adapter directly to the brake mounting base, largely avoiding the brake boss.

By relieving the brake boss or brake axle from torsional stresses acting in a plane containing the brake boss axis, the adapter of the invention maintains the linear alignment of the brake boss along its length. As a consequence, the brake mechanism maintains a precise, tight and predictable movement of the brake lever arm in a plane perpendicular to the plane of wheel rotation. The adapter thereby greatly improves the precision of control which a bicycle rider is able to exert over the braking action.

A further object of the invention is to provide an adapter that can be fitted as an after-market accessory onto standard, commercially available brake bosses. The adapter of the invention may be utilized both with the commercially predominant form of brake boss in which a pair of diametrically opposing wrench flats are defined on the torque ring to fasten the brake boss to the brake mounting base, as well as alternative styles of brake bosses which employ a torque ring having a hex nut outer surface for this purpose.

In one broad aspect the present invention may be considered to be a bicycle brake adapter for mounting a bicycle brake lever arm having a mounting opening therethrough to a bicycle brake axle projecting out of a brake mounting base a predetermined axle length distance. The bicycle brake adapter is comprised of a tubular, annular sleeve having an inner diameter which snugly receives the brake axle coaxially therewithin and an outer diameter that fits within the brake lever arm mounting opening, and an adapter flange that projects radially from the adapter sleeve at a proximal end thereof. The brake adapter has a length greater than the axle length distance. Preferably, the outer diameter of the adapter sleeve is at least fifty percent greater than the inner diameter thereof. Preferably also, the brake adapter has at lest one counterbore defined therein having a diameter larger than the inner diameter of the sleeve. The counterbore is defined coaxially with the inner diameter of the sleeve and extends at least part way through the flange.

In another broad aspect, the invention may be considered to be an improvement in a bicycle brake mechanism in which a brake lever arm carrying a brake pad has a mounting end mounted for rotation about a brake axle projecting out of a brake mounting base on a bicycle frame member. The improvement is comprised of a brake adapter formed with a cylindrical, annular sleeve having a distal end and an opposite proximal end. The proximal end terminates in a radially outwardly projecting bearing flange. The brake adapter sleeve is mounted coaxially about the brake axle and is interposed between the brake axle and the mounting end of the brake lever arm in bearing relationship against the brake mounting base. A brake arm retainer is secured to the brake axle in bearing relationship against the brake adapter sleeve. The brake arm retainer longitudinally confines the mounting end of the brake lever arm between the brake mounting base and the brake arm retainer. The brake lever arm is journaled for rotation about the brake adapter. Preferably, the brake axle has a cylindrical outer surface and the annular sleeve has an inner diameter that snugly receives the cylindrical outer surface of the brake axle therewithin. Also, the sleeve has an outer diameter that is at least about fifty percent greater than the inner diameter of both the sleeve and the diameter of the brake axle.

In still another broad aspect, the invention may be considered to be a bicycle brake mechanism for mounting on a brake axle protruding from a brake mounting base on a bicycle frame member. The bicycle brake mechanism is comprised of a brake adapter formed with a cylindrical annular sleeve disposed coaxially about and extending distally beyond the brake axle. The sleeve has an annular, radially outwardly projecting bearing flange with a distal face and an opposite proximal face. The proximal face bears against the brake mounting base. A proximal, annular thrust bearing is disposed about the brake adapter sleeve and resides in bearing contact against the distal face of the bearing flange. A cylindrical, annular bearing is disposed coaxially about the brake adapter sleeve. A brake lever arm is provided having a mounting end with a cylindrical opening therethrough mounted in bearing contact with the proximal thrust bearing and coaxially about the brake adapter sleeve. The cylindrical, annular bearing is thereby interposed between the brake adapter sleeve and the brake lever arm mounting end. A distal, annular thrust bearing is disposed coaxially about the brake adapter sleeve and resides in bearing contact against the mounting end of the brake lever arm. A cap is secured to the brake axle and resides in bearing relationship against the brake axle sleeve and in spaced separation from the brake axle.

Preferably, a plurality of axial counterbores are defined in the brake adapter where the bearing flange is formed. The counterbores all have diameters greater than the inner diameter of the brake adapter sleeve. The counterbores are of decreasing diameter and increasing depth proceeding axially from the bearing flange.

The invention may be described with greater clarity and particularity by reference to the accompanying drawings.

DESCRIPTION OF THE EMBODIMENT

Figure 1:
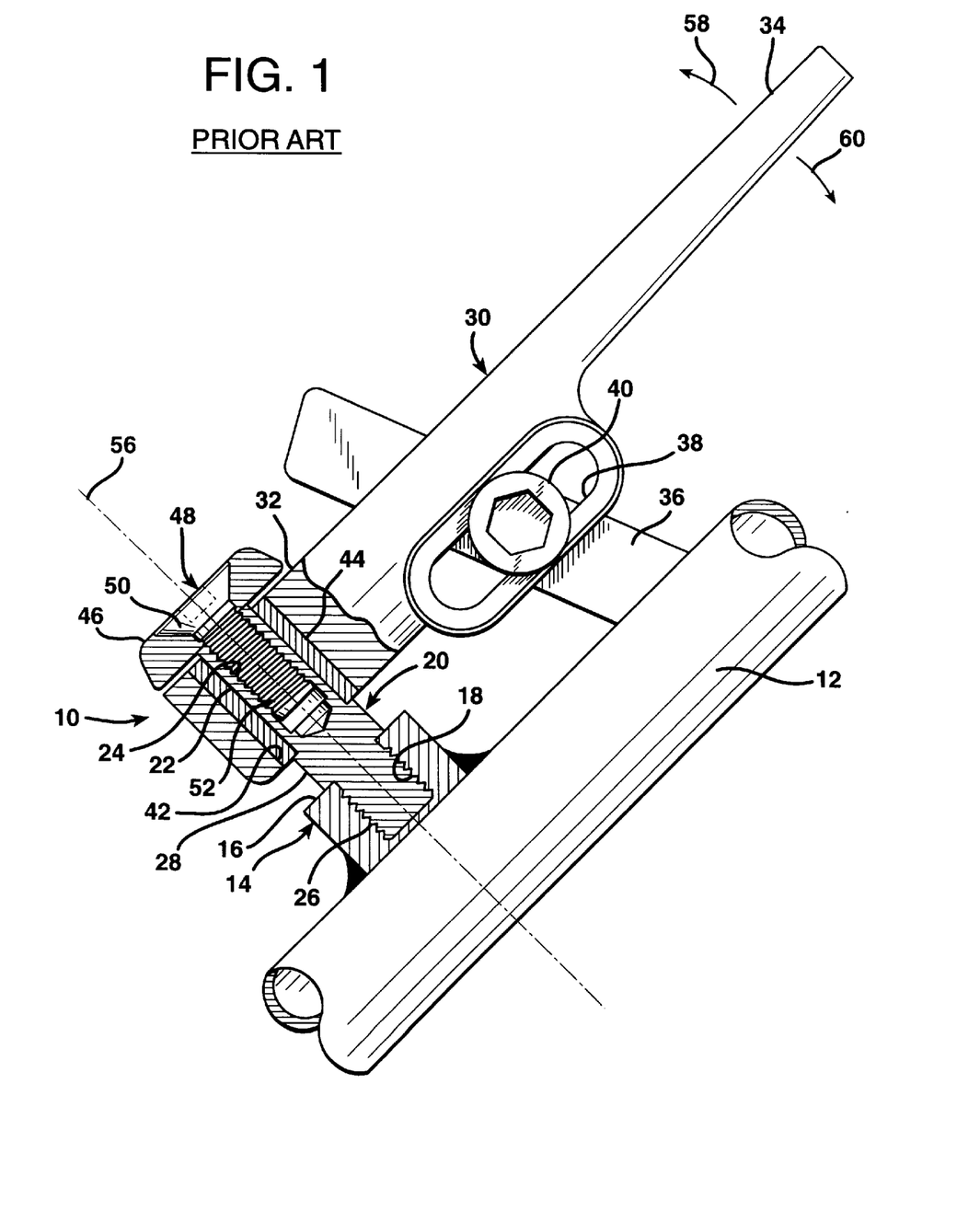
FIG. 1 is a side elevational view, partially in section, illustrating a portion of one conventional prior art bicycle brake mechanism.

FIG. 1 illustrates a conventional bicycle brake mechanism 10 of the type commercially available and typically employed in BMX and mountain bikes. The bicycle brake mechanism 10 is mounted on a fork arm 12 of a bicycle fork within which a bicycle wheel rotates in a plane parallel to the portion of the fork arm 12 depicted. A conventional, generally cylindrical bicycle brake mounting base 14 is welded to the inside surface of the fork arm 12 to project outwardly therefrom. The axis of the brake mounting base 14 is oriented parallel to the plane of rotation of the bicycle wheel. The bicycle brake mounting base 14 has an outwardly facing, annular bearing surface 16. A central, axial, internally tapped bore or well 18 is defined in the structure of the brake mounting base 14 and extends inwardly generally toward the fork arm 12 from the bearing surface 16.

The brake mechanism 10 employs a pair of detachable and replaceable brake axles 20, known in the trade as brake bosses. Each brake boss 20 has a distal, outer brake lever arm receiving end 22 having a cylindrical outer diameter of 0.314 inches (about 8 millimeters). The distal brake lever arm receiving end 22 of the brake boss 20 is located remote from the brake mounting base 14 and has an internally tapped, axial bore 24 defined therewithin at its distal extremity. The opposite, proximal end 26 of the brake boss 20 is externally threaded with male threads that are threadably engaged in the internally tapped bore 18 of the brake mounting base 14.

At the transition between the proximal end 26 and the distal end 22, the brake boss 20 is configured with a radially outwardly stepped torque ring 28 that is 0.368 inches (about 9.3 millimeters) in diameter. The torque ring 28 has a pair of conventional diametrically opposed wrench flats (not depicted) defined thereon so as to allow the externally threaded proximal end 26 of the brake boss 20 to be advanced into and withdrawn from the internally tapped bore 18. The distal portion 22 of the brake boss 20 extends 0.649 inches outwardly from a stepped shoulder where it meets the torque ring 28 a distance of 0.649 inches (about 16.5 millimeters).

The prior art brake mechanism 10 employs a brake lever arm 30 having a mounting end 32 and an opposite distal, cantilevered end 34. A brake pad 36 is secured to the cantilevered end 34 at a selected position along an elongated brake pad clamping slot 38 by means of a clamping screw 40. The position of the brake pad 36 both in angular orientation relation to the clamping slot 38, and in distance from the axis of rotation of the brake lever arm 30 at its mounting end 32 is adjustable by loosening and tightening the clamping screw 40.

A smooth, cylindrical opening 42 is defined through the mounting end 32 of the brake lever arm 30. A cylindrical, annular Teflon® bearing 44 surrounds the distal portion 22 of the brake boss 20 throughout most of its length to provide a journaled connection between the mounting end 32 of the brake lever arm 30 and the brake boss 20.

The brake lever arm 30 is secured in position for rotation about the distal end 22 of the brake boss 20 by means of an annular retaining cap 46 and a flathead clamping machine screw 48. The clamping screw 48 has a head 50 that bears against a chamfered opening at the center of the retaining cap 46 and an externally threaded shank 52 that is threadably engaged in the internally tapped bore 24 in the distal end 22 of the brake boss 20.

The axis of the brake mounting base 14, the brake boss 20, and the retaining screw 48 is indicated at 56 in FIG. 1. As is evident in that drawing figure, the brake boss 20 is subjected to considerable torsion due to the moments of force created by friction between the brake pad 36 and the rim of the bicycle wheel. These torsional forces are indicated by the directional arrows 58 and 60 in FIG. 1. The torsional forces exerted on the brake boss 20 by friction of the brake pad 36 against the wheel rim in the directions 58 and 60 create a torsional moment in a plane passing through the axis 56.

The brake boss 20 has a relatively small diameter. As illustrated in FIG. 1, in a conventional system there is no support for the brake lever arm 30 to prevent it from bending and pulling the brake boss 20 in the directions 58 and 60. As a consequence, the distal end 22 of the brake boss 20 frequently bends out of alignment with the axis 56.

Figure 2:
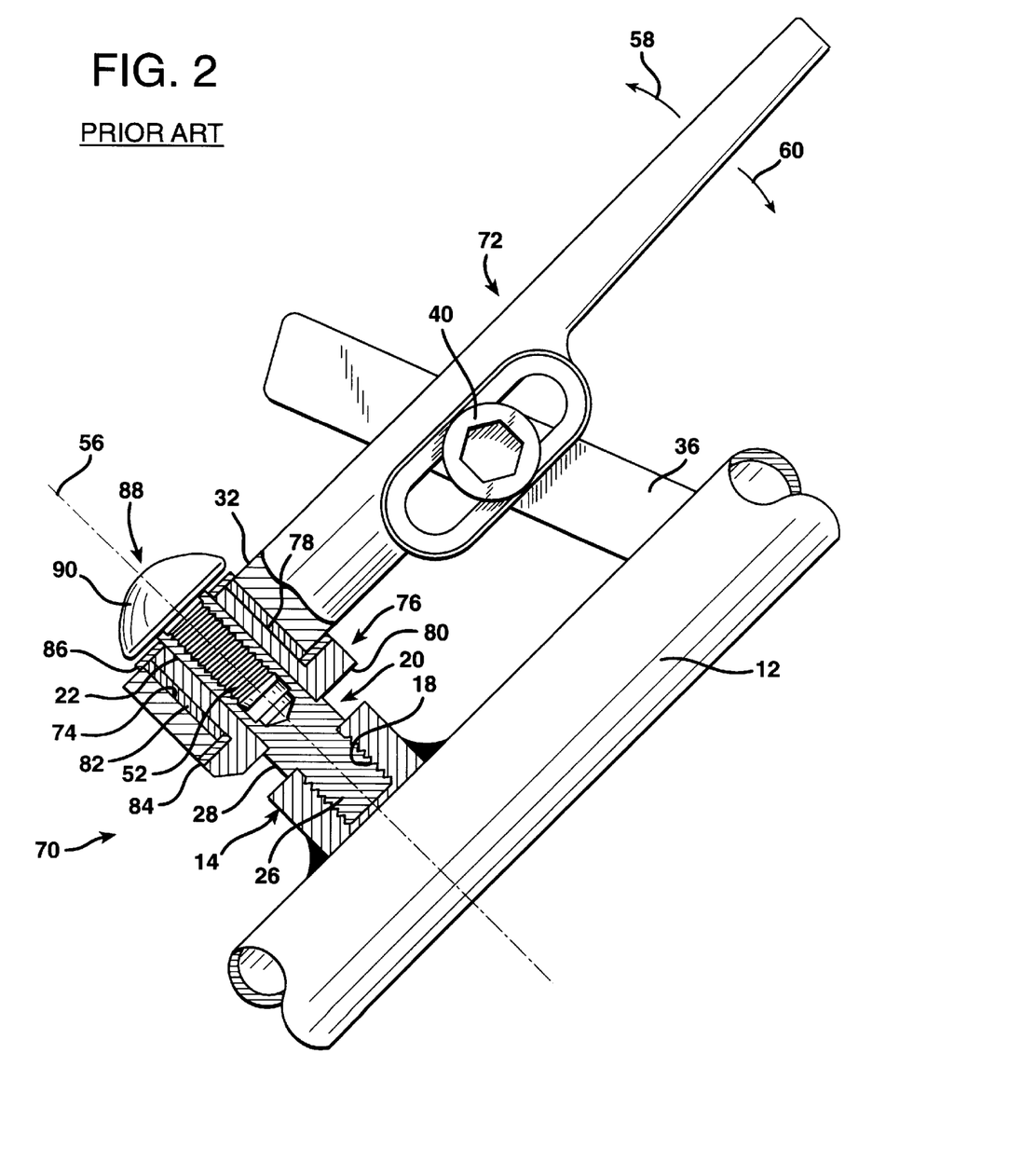
FIG. 2 is a side elevational view, partially in section, illustrating a portion of another conventional prior art bicycle brake mechanism that unsuccessfully attempts to solve the problem solved by the present invention.

FIG. 2 illustrates one prior art attempt to remedy this bending problem by employing a different brake mechanism 70. The portion of the bicycle depicted and the brake mechanism 70 employ many of the same components illustrated in the embodiment of FIG. 1. These components bear the same reference numbers utilized in the embodiment of FIG. 1.

The brake mechanism 70 differs from the brake mechanism of FIG. 1 in that the brake lever arm 72 employed has a larger diameter opening 74 in its mounting end 32 than the mounting opening 42 of the brake lever arm 30. The brake mechanism 70 also employs an adapter 76 which is interposed between the mounting end 32 of the brake lever arm 72 and the brake boss 20.

The adapter 76 has a cylindrical, annular, distal portion 78 and an annular, proximal portion that terminates in an annular, radially outwardly directed flange 80. The brake mechanism 70 also employs a cylindrical annular Teflon® bearing 82 that is larger in diameter than the cylindrical bearing 44 of the brake mechanism 10, a proximal, annular Teflon® thrust bearing 84 interposed between the bearing flange 80 of the adapter 76 and the mounting end 32 of the brake lever arm 72, and a distal, annular Teflon® thrust bearing 86 that bears against the opposite side of the mounting end 32 of the brake lever arm 72. The brake lever arm 72 is held in a position journaled to the brake boss 20 by means of a retaining screw 88 that has a round head 90 and a shank 52. The shank 52 is threadably engaged in the internally tapped bore 24 of the brake boss 20.

The purpose of the adapter 76 in the brake mechanism 70 is to attempt to distribute the torsional forces exerted in the directions 58 and 60 over the greater surface of the distal end 78 and bearing flange 80 of the adapter 76, as contrasted with the corresponding, smaller surfaces of the distal end 22 and shoulder at the torque ring 28 of the brake boss 20. However, the adapter 76 of the brake mechanism 70 fails to solve the problem of bending. Although the adapter 76 having a greater surface area than the brake boss 20 is interposed between the brake boss 20 and the mounting end 32 of the brake lever arm 72, the bending forces applied in the directions 58 and 60 still ultimately act entirely through the structure of the brake boss 20. As a consequence, the brake mechanism 70 still suffers from a bending action due to forces applied in the directions 58 and 60 during braking of the bicycle. That is, as in the prior art embodiment of FIG. 1, use of the brake mechanism 70 in the prior art embodiment of FIG. 2 still results in bending of the distal end 22 of the brake boss 20 out of alignment with the axis 56.

The present invention, on the other hand, provides a novel solution to the bending problem that adopts a unique approach. One embodiment of the improved bicycle brake mechanism 100 is illustrated in FIGS. 4 through 8. In those drawing figures elements of the bicycle and the improved brake mechanism 100 that are the same as those depicted in FIGS. 1 and 2 bear the same reference numbers.

Figure 3:
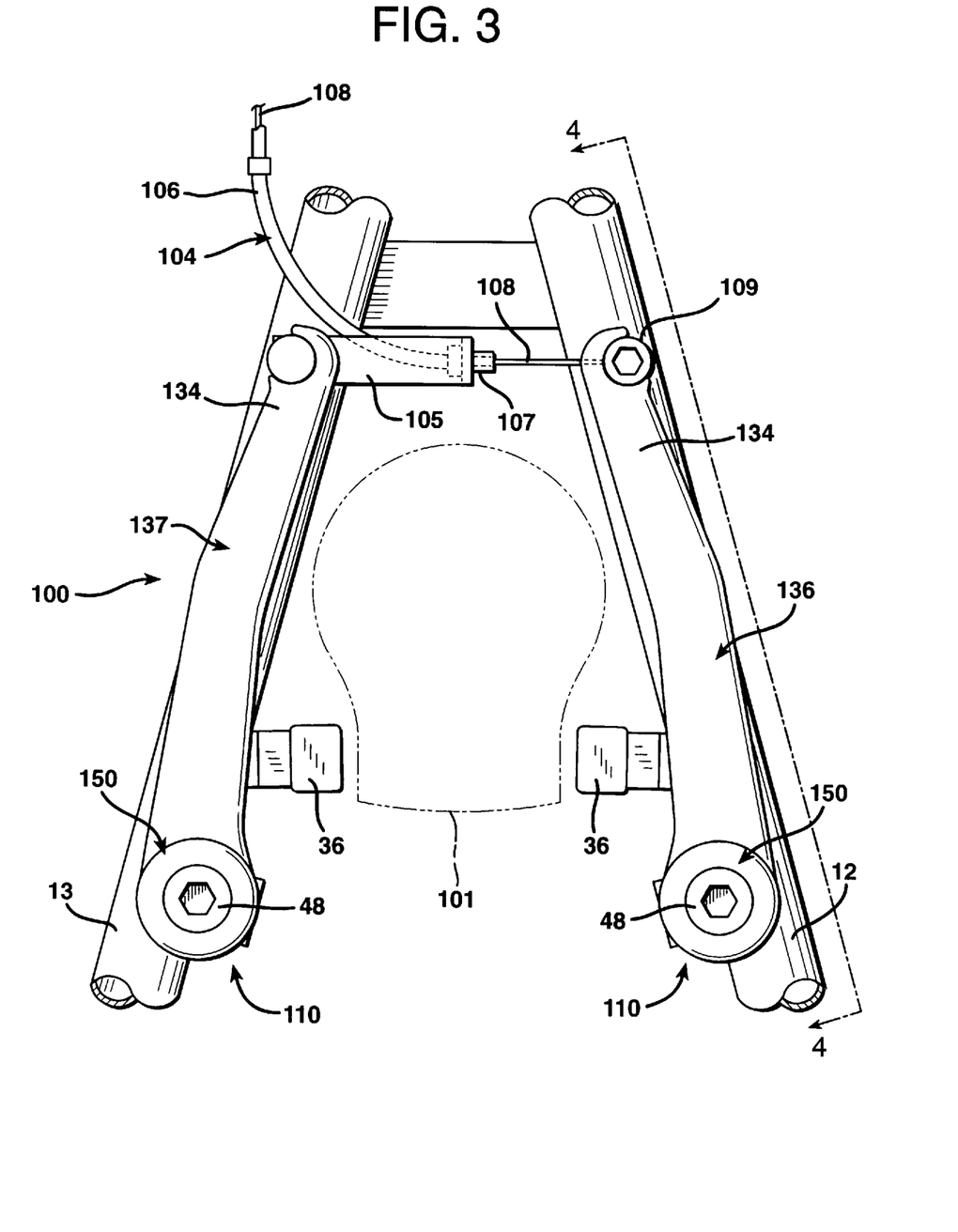
FIG. 3 is a transverse elevational view of one preferred embodiment of a bicycle brake mechanism according to the present invention.
Figure 4:
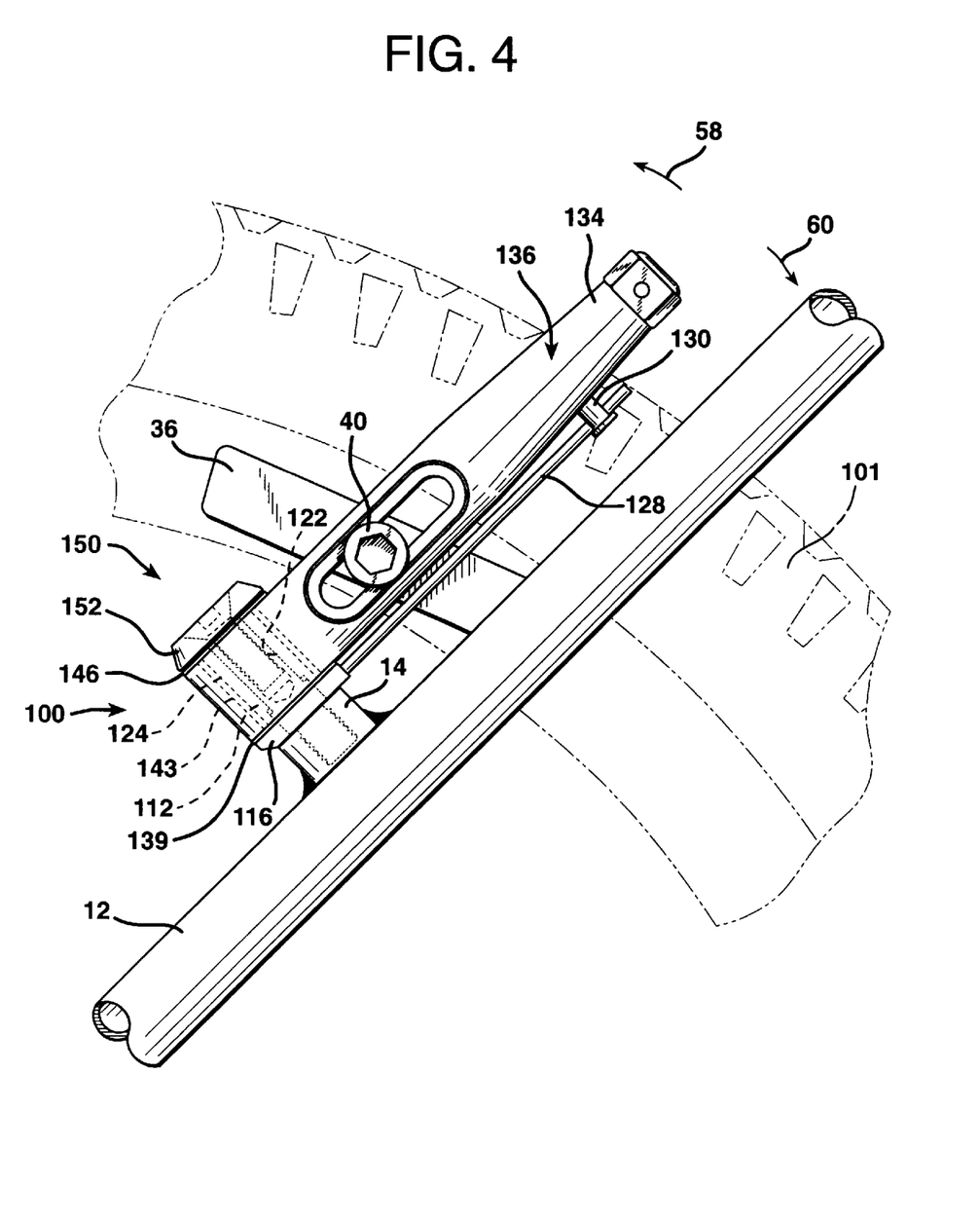
FIG. 4 is a side elevational detail taken along the lines 4—4 of FIG. 3.

FIGS. 3 and 4 illustrate the operation of the bicycle brake mechanism 100 according to the invention. As illustrated in those drawing figures, a bicycle wheel 101, shown in phantom, is located within the confines of a pair of bicycle fork arms 12 and 13. The brake mechanism 100 of the invention employs a pair of brake lever arms 136 and 137, which are of mirror image construction. The brake lever arms 136 and 137 are mounted to the brake mounting bases 14 on each of the fork arms 12 and 13 in a manner hereinafter to be described. Each of the brake lever arms 136 and 137 carries a brake pad 36.

As illustrated in FIG. 3, the brake pads 36 are brought to bear against the rim of the bicycle wheel 101 by means of a conventional, hand-actuated brake tensioning cable 104. The brake lever arm 137 carries a generally U-shaped cable bracket 105. The cable sheath 106 of the cable 104 is secured to the web of the U-shaped bracket 105 by a conventional termination 107. The central wire cable core 108 of the cable assembly 104 passes through the sheath termination 107 and is rigidly secured to a cable termination lug 109 by a set screw in a conventional manner.

When tension is exerted on the central cable core 108 of the cable assembly 104 within the sheath 106, the distal ends 134 of the brake lever arms 136 and 137 are drawn in toward each other, thereby bringing the brake pads 36 to bear against the rim of the bicycle wheel 101. The braking action of the brake mechanism 100 is conventional and need not be described further. However, the structure of the brake mechanism 100 is significantly different from prior art systems and provides the user with distinct advantages.

Figure 6:
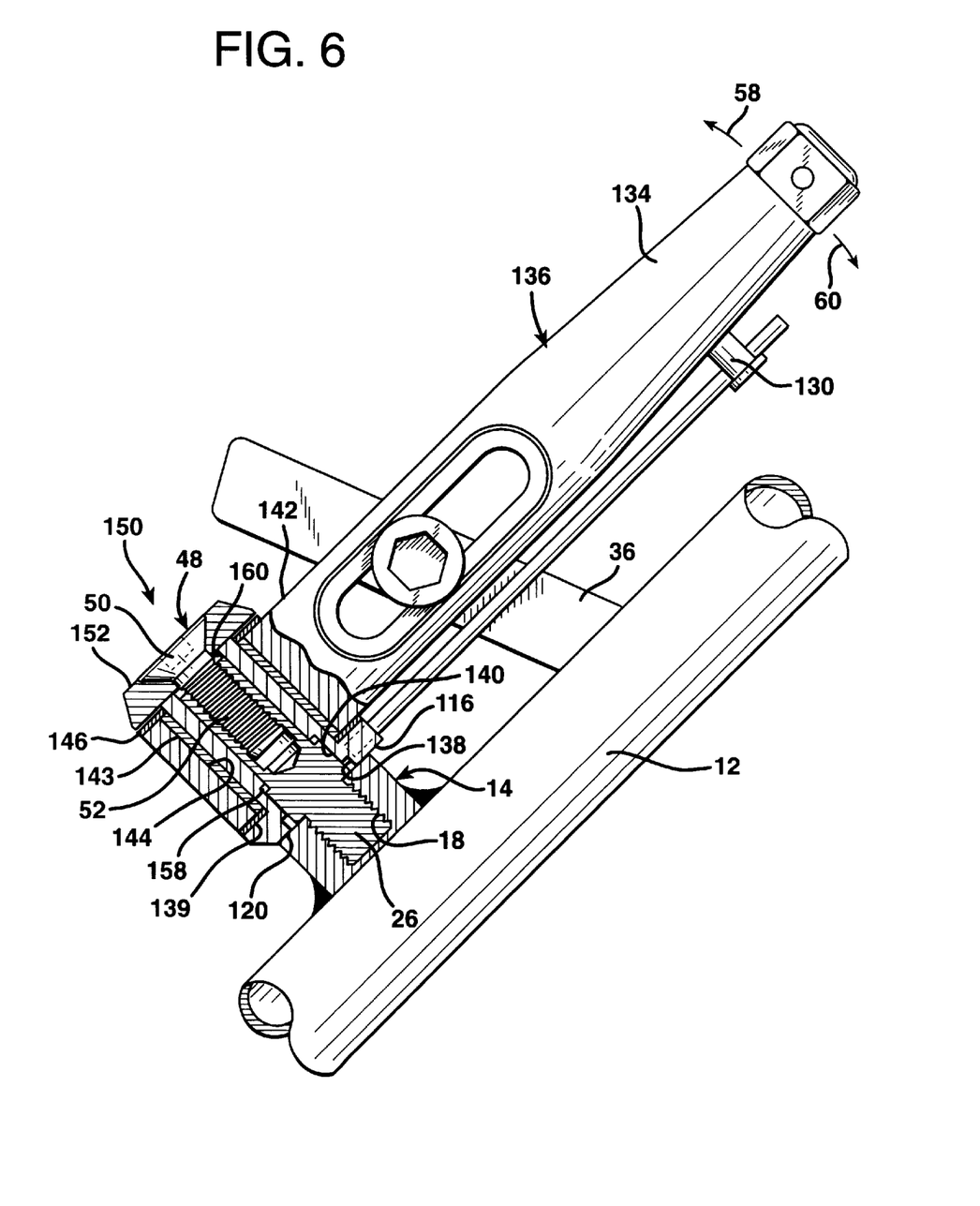
FIG. 6 is an enlarged detail, partially in section, of the portion of the brake mechanism illustrated in FIG. 4.

The brake mechanism 100 employs a pair of adapters 110, each of which is somewhat similar in configuration to the adapter 76, but which has small but extremely significant differences. The metal adapter 110 is fabricated from 7075-T6 aluminum alloy. The adapter 110 is formed with a cylindrical, annular sleeve 112 that is disposed coaxially about and extends distally beyond the brake axle or brake boss 20, as best illustrated in FIG. 6. The sleeve 112 has a distal end 114 and an opposite proximal end terminating in a radially outwardly projecting, annular bearing flange 116. The bearing flange 116 has a distal face 118 and a proximal face 120.

The distal end 114 of the adapter sleeve 112 has an inner cylindrical brake axle receiving surface 122 with an inner diameter of 8.025 millimeters with tolerances of plus 0.127 millimeters and minus 0.0 millimeters and an outer cylindrical surface 124 having a diameter of 13 millimeters with tolerances of plus 0.0 millimeters and minus 0.043 millimeters. As a consequence, the diameter of the outer cylindrical surface 124 of the sleeve 112 is at least about fifty percent greater than the diameter of the inner brake axle receiving surface 122 of the sleeve 112.

Figure 5:
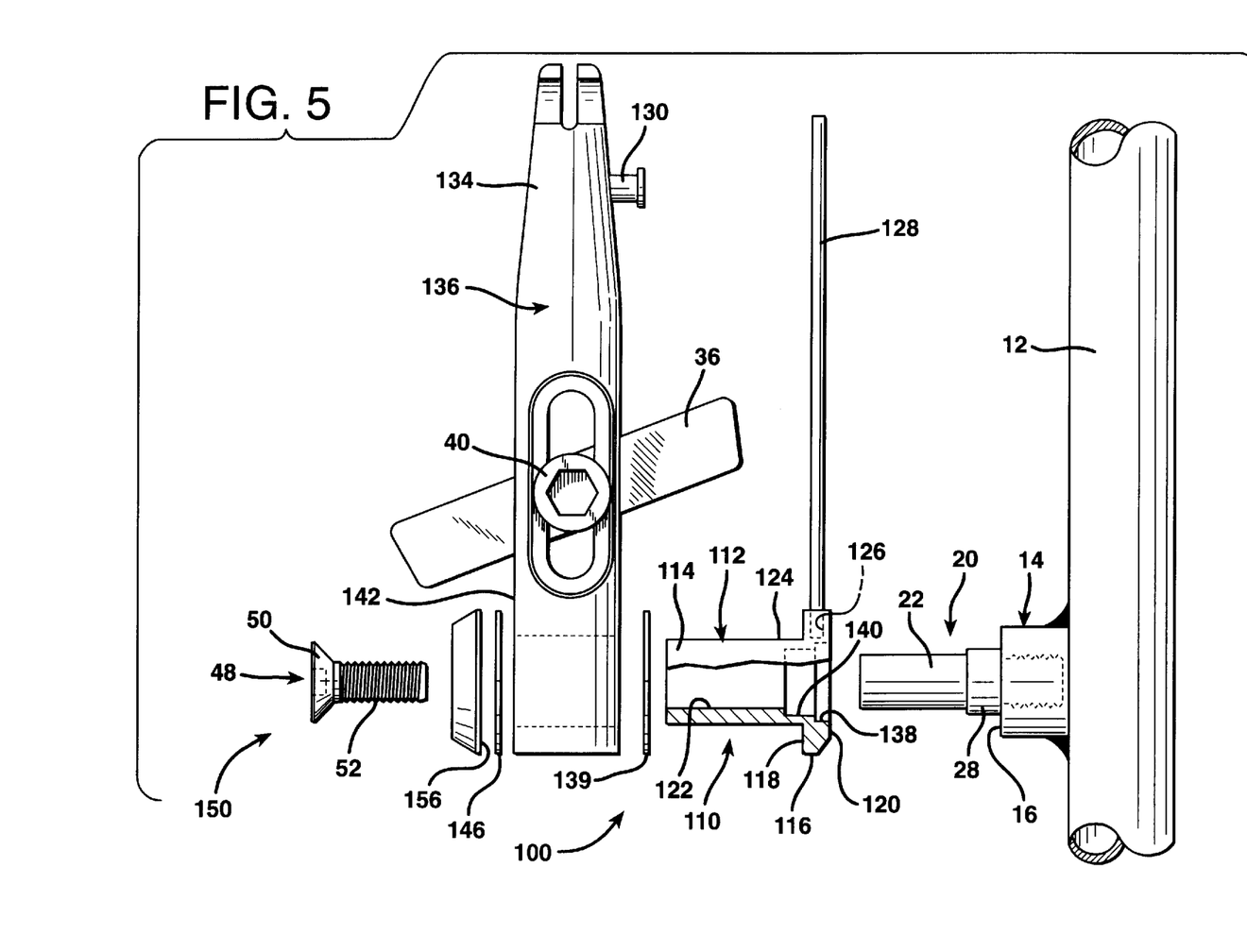
FIG. 5 is an exploded view, partially in section, of the portion of the brake mechanism illustrated in FIG. 4.
Figure 8:
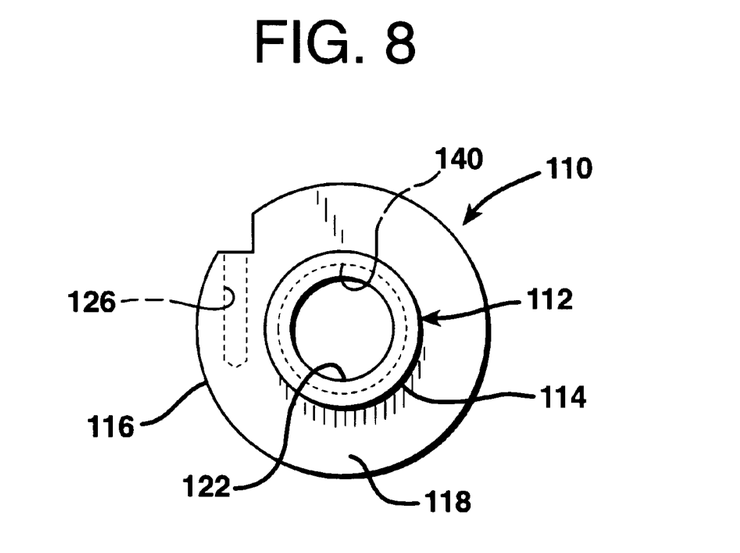
FIG. 8 is a transverse view taken along the lines 8—8 of FIG. 7.

As depicted in FIGS. 5 and 8, the flange 116 defines a spring socket 126 therewithin to receive a linear spring 128. One end of the linear spring 128 is bonded or staked in place in the spring socket 126. The other end of the linear spring 128 bears against a spring bearing post 130 that projects from the distal end 134 of the brake lever arm 136, as illustrated in FIG. 6.

Figure 7:
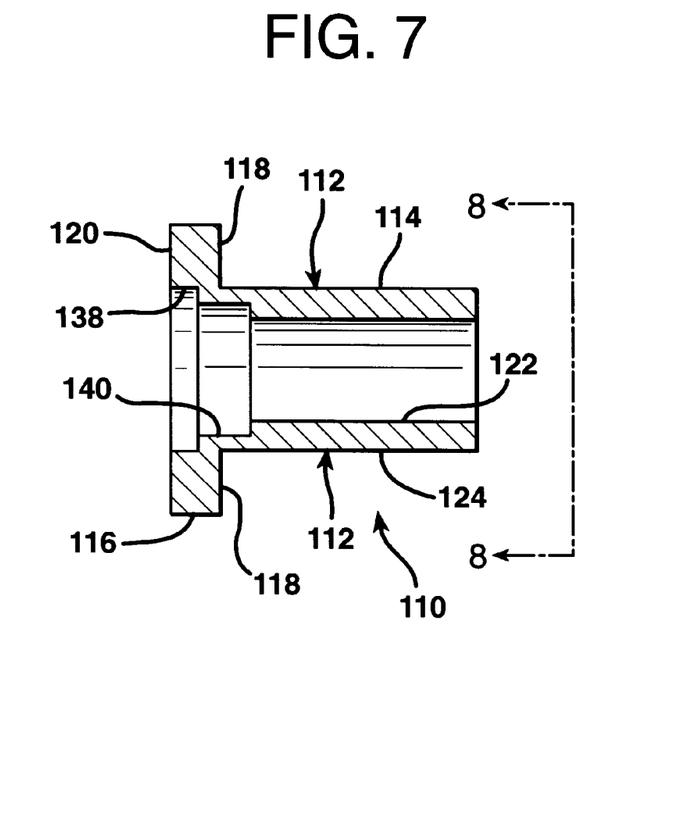
FIG. 7 is an isolated sectional elevational view of a bicycle brake adapter according to the embodiment of the present invention employed in FIG. 4.

As best illustrated in FIG. 7, a plurality of coaxial counterbores 138 and 140 are defined in the brake adapter 110 at the proximal face 120 of the bearing flange 116. The counterbores 138 and 140 are of decreasing diameter and increasing depth proceeding in a distal direction from the proximal face 120 at the proximal end of the adapter sleeve 112 at which the flange 116 is formed, and extend at least part way through the flange 116.

The counterbores 138 and 140 both have diameters greater than the inner diameter of the inner surface 122 of the adapter sleeve 112. More specifically the counterbore 138 has a diameter of 12.0 millimeters with tolerances of plus 0.254 millimeters and minus 0.0 millimeters. The counterbore 138 is two millimeters in depth from the proximal face 120 with tolerances of plus 0.254 millimeters and minus 0.0 millimeters. The counterbore 140 has a diameter of 10.058 millimeters with tolerances of plus 0.127 millimeters and minus 0.0 millimeters. The depth of the counterbore 140 from the proximal face 120 of the flange 116 is 6.2 millimeters with tolerances of plus 0.508 millimeters and minus 0.0 millimeters.

By providing the adapter 110 with the counterbores 138 and 140 as described, the adapter 110 may be utilized with virtually any brake boss 20 that is commercially available. The counterbore 140 adapts the smaller diameter but deeper torque ring 28, having wrench flats thereon, of the type depicted in FIGS. 1–6 as previously described. The counterbore 138 is large enough to accommodate a wider hex head torque ring 28' formed on other brake bosses 20' that are sold and are compatible for use with the brake mounting base 14, as illustrated. The torque rings 28 and 28', though unequal in diameter are the same axial length. Therefore, when the adapter 110 is utilized with a bicycle brake employing a brake boss 20', an annular, aluminum spacer 123 must be interposed between the proximal surface 120 of the bearing flange 116 and the bearing surface 16 of the bicycle brake mounting base 14.

The brake bosses 20 and 20' project out of the brake mounting base 14 a first, predetermined longitudinal distance therefrom, which is equal to the length of the distal end 22 plus the length of the torque ring 28 or 28' of the standard size brake bosses 20 and 20'. This first predetermined distance is equal to 0.854 inches (about 21.7 millimeters).

Figure 10:
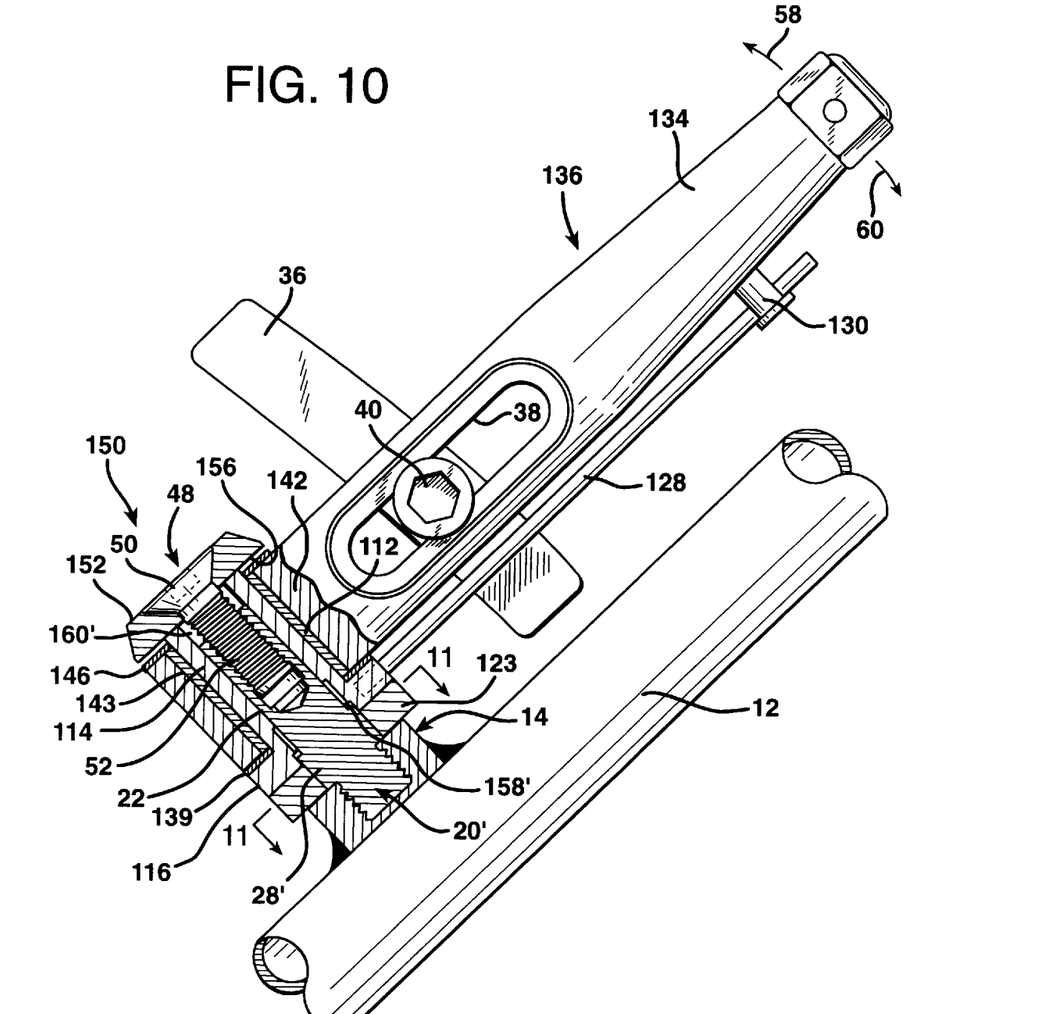
FIG. 10 is an enlarged detail, partially in section, showing the portion of the brake mechanism illustrated in FIG. 9.

The annular sleeve 112 is disposed coaxially about and extends distally beyond both the brake boss 20, as illustrated in FIG. 6, and the brake boss 20' as illustrated in FIG. 10. The length of the adapter sleeve 112, as measured from the proximal face 120 of flange 116 to the annular bearing face of the distal end 114 thereof, is equal to a second, predetermined longitudinal distance greater than the distance that the brake boss projects from the brake mounting face 14. Specifically, the overall length of the adapter 110 is equal to 22.7 millimeters with tolerances of plus 0.508 millimeters and 0.0 millimeters.

A proximal, flat, annular, Teflon® thrust bearing 139 is disposed about the brake adapter sleeve 112 and resides in bearing contact against the distal face 118 of the bearing flange 116. A cylindrical, annular bearing 143, also formed of Teflon®, is disposed coaxially about the brake adapter sleeve 112.

The brake arms 136 and 137 each have a mounting end 142 with a cylindrical mounting opening 144 therethrough. The mounting ends 142 of the brake arms 136 and 137 are mounted in bearing contact with the proximal thrust bearings 139 and coaxially about the brake adapter sleeves 112. The cylindrical, annular bearings 143 are interposed between the brake adapter sleeve 112 and the brake lever arm mounting ends 142.

A distal, annular thrust bearing 146, also formed of Teflon®, is disposed coaxially about the extremity of the distal end 114 of each brake adapter sleeve 112. The distal thrust bearing 146 resides in bearing contact against the mounting ends 142 of the brake arms 136 and 137.

The brake mechanism 110 of the invention also includes a brake arm retainer indicated generally at 150 for each of the brake arms 136 and 137. Each brake arm retainer 150 is comprised of a clamping machine screw 48 and a generally flat, annular cap 152, chamfered both internally and externally. The cap 152 resides in bearing relationship against the tip of the distal end 114 of the brake adapter sleeve 112 that projects distally beyond the distal end 22 of the brake boss 20. The distal thrust bearing 146 is disposed coaxially about the distal extremity of the distal end 114 of the adapter sleeve 112.

The retaining clamping screw 48 is employed to secure the cap 152 in tight, bearing relationship against the distal tip of the brake adapter sleeve 112. The head 50 of the clamping screw 48 bears against the cap 152 and the shank 52 of the clamping screw 48 is engaged in the tapped axial bore 24 in the distal end 22 of one of the brake bosses 20 or 20'. The shank 52 of the clamping screw 48 passes axially through the annular clamp 152 and is threadably engaged in the tapped bore 24 of one of the brake bosses 20 or 20'.

The brake arm retainer 150 secures the brake bosses 20 or 20' in bearing relationship against the brake adapter sleeve 112 to longitudinally confine the mounting end 142 of the brake lever arm 136 between the brake mounting base 14 and the brake arm retainer 150. The brake lever arm 136 is thereby journaled for rotation about the brake adapter 110 by means of the cylindrical, annular bearing 143 and the proximal and distal thrust bearings 139 and 146.

The brake bosses 20 and 20' project out of the brake mounting base 14 a first, predetermined longitudinal distance therefrom, which is equal to the length of the distal end 22 plus the length of the torque ring 28 or 28' of the standard size brake bosses 20 and 20'. This first predetermined distance is equal to 0.854 inches (about 21.7 millimeters).

Figure 9:
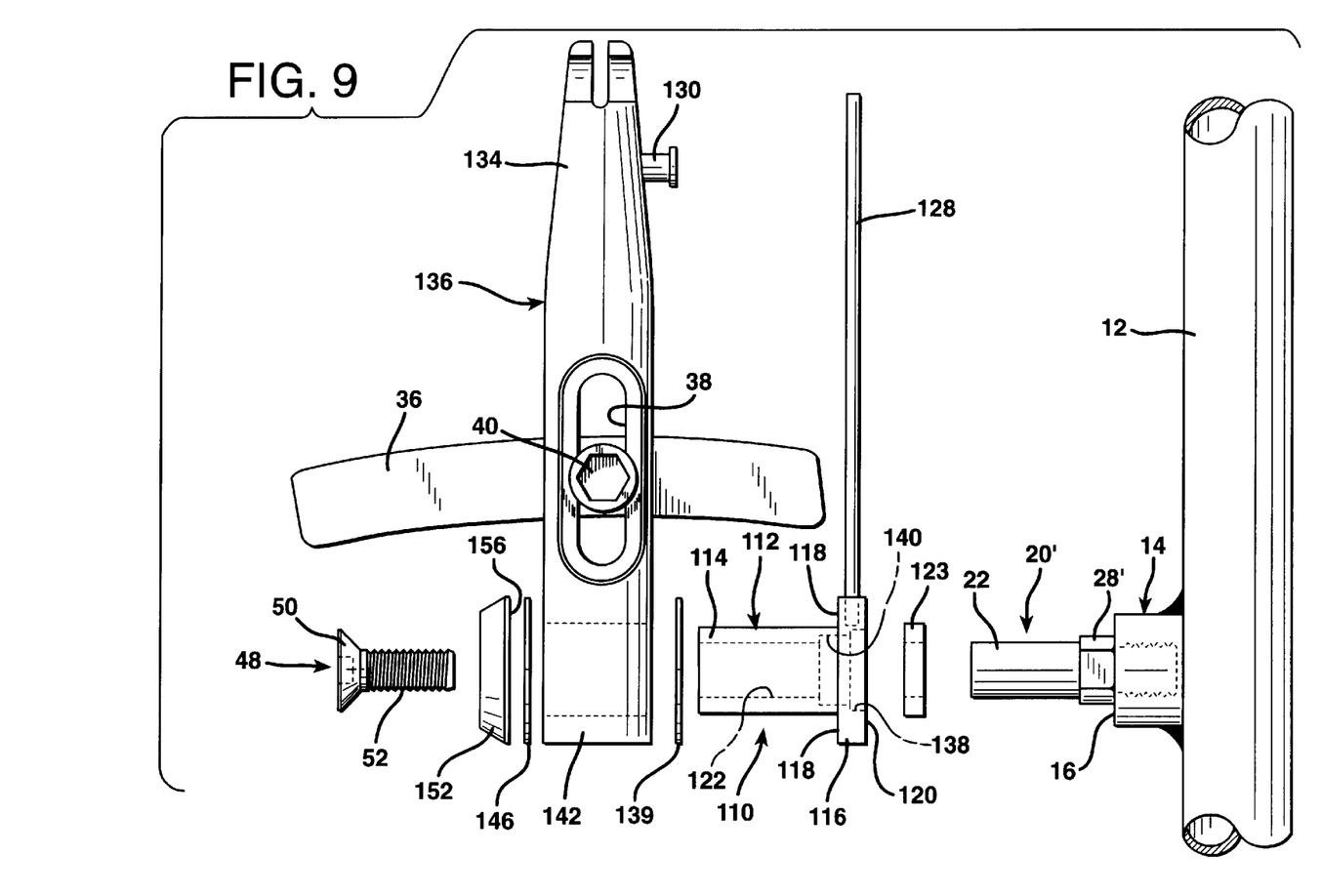
FIG. 9 is an exploded view of a portion of another brake mechanism employing a brake axle of alternative configuration to that depicted in FIG. 5.
Figure 11:
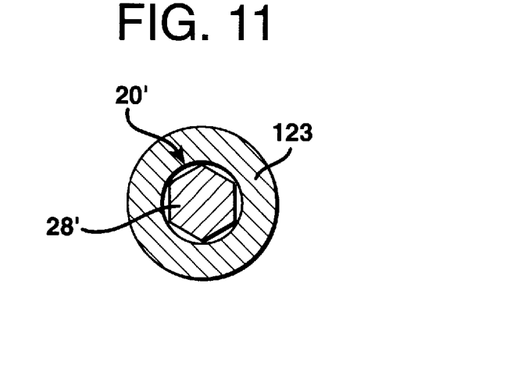
FIG. 11 is a sectional detail taken along the lines 11—11 in FIG. 10.

A very important feature of the invention is that the bearing face 156 of the cap 152 resides in bearing relationship against the brake adapter sleeve 112 at a second, predetermined, longitudinal distance from the brake mounting base 14. In the embodiment of FIGS. 3–8 this distance is equal to the overall length of the brake adapter 110. In the embodiment of FIGS. 9–11 this second predetermined distance is equal to the overall length of the brake adapter 110 plus the axial length of the spacer 123. In both embodiments the distance from the bearing face 156 of the retaining clamp 152 to the brake mounting base 14 is greater than the first longitudinal distance between the brake mounting base 14 and the distal tip of either one of the brake bosses 20 and 20'.

A comparison of the brake mechanism 100 of the present invention with the prior art brake mechanisms 10 and 70, depicted in FIGS. 1 and 2, illustrates the distinct advantages of the present invention. As illustrated in FIGS. 6 and 10, the adapter 110 of the invention is clamped tightly between the retainer 150 and the brake mounting base 14. The depth of the smaller diameter concentric counterbore 140 is greater than the axial length of the standard torque ring 28 in the commercially available brake boss 20. The depth of the larger diameter concentric counterbore 138 plus the axial length of the spacer 123 is greater than the axial length of the hex head torque ring 28'. As a consequence, there is always a small annular gap 158 or 158' between the distally facing shoulder of the brake boss torque ring 28 or 28' and the overhanging structure of the brake adapter sleeve 112.

Also, the adapter sleeve 112 extends at least a short distance beyond the distal tip of the distal end 22 of either the brake boss 20 or the brake boss 20'. This results in a small, annular gap 160 or 160' between the bearing surface 156 of the retainer cap 152 and the distally facing annular end of the distal end 22 of the brake boss 20 or 20'.

Due to the construction of Applicant's brake mechanism 100, torsional forces exerted in the directions 58 and 60 are not transmitted through the structure of the narrow, relatively vulnerable bearing boss 20 or 20', but rather entirely through the structure of the brake adapter 110. The solid bearing relationship between the adapter flange 116 and the brake mounting base 14, with or without the spacer 123, and the bearing relationship between the brake adapter sleeve 112 and the retainer 150 ensure that torque exerted by forces in the directions 58 and 60 is transmitted almost entirely to the bicycle frame through the adapter 110, and never reaches either the bearing boss 20 or the bearing boss 20'.

The unique brake adapter construction and the unique brake mechanism according to the invention provide a vastly superior bicycle brake mounting system. The system of the invention virtually eliminates the propensity of the brake boss to bend due to torsional moments applied in planes containing the brake boss axes.

Undoubtedly, numerous variations and modifications of the invention will become readily apparent to those familiar with bicycle brake systems. For example, the dimensions and spacing of the brake adapter and the components with which the brake adapter interacts may be varied while still employing the principals of the invention. Accordingly, the scope of the invention should not be construed as limited to the specific embodiments depicted and described.

I claim:

1. A bicycle brake adapter for mounting a bicycle brake lever arm having a mounting opening therethrough to a bicycle brake axle projecting out of a brake mounting base a predetermined axle length distance comprising a tubular, annular sleeve having an inner diameter that snugly receives said brake axle coaxially therewithin and an outer diameter that fits within said brake lever arm mounting opening and is at least fifty percent greater than said inner diameter thereof, and an adapter flange that projects radially from said adapter sleeve at a proximal end thereof, and said brake adapter has a length greater than said axle length distance.

2. A bicycle brake adapter according to claim 1 wherein at least one counterbore having a diameter larger than said inner diameter of said sleeve is defined coaxially therewith at least part way through said flange at said proximal end of said sleeve.

3. A bicycle brake adapter for mounting a bicycle brake lever arm having a mounting opening therethrough to a bicycle brake axle projecting out of a brake mounting base a predetermined axle length distance comprising a tubular, annular sleeve having an inner diameter that snugly receives said brake axle coaxially therewithin and an outer diameter that fits within said brake lever arm mounting opening, and an adapter flange that projects radially from said adapter sleeve at a proximal end thereof, and said brake adapter has a length greater than said axle length distance, and wherein a spring socket is defined in said flange to anchor one end of a linear spring therein.

4. A bicycle brake adapter for mounting a bicycle brake lever arm having a mounting opening therethrough to a bicycle brake axle projecting out of a brake mounting base a predetermined axle length distance comprising a tubular, annular sleeve having an inner diameter that snugly receives said brake axle coaxially therewithin and an outer diameter that fits within said brake lever arm mounting opening, and an adapter flange that projects radially from said adapter sleeve at a proximal end thereof, and said brake adapter has a length greater than said axle length distance, and further defines therewithin a plurality of coaxial counterbores of decreasing diameter and an increasing depth proceeding in a distal direction from said proximal end of said adapter sleeve to thereby accommodate different models of brake axles.

5. In a bicycle brake mechanism in which a brake lever arm carrying a brake pad has a mounting end mounted for rotation about a brake axle projecting out of a brake mounting base on a bicycle frame member, and said brake axle has an outer mounting surface which has a diameter, the improvement comprising a brake adapter formed with a cylindrical, annular sleeve having a distal end and an opposite proximal end terminating in a radially outwardly projecting bearing flange, and said annual sleeve has a cylindrical outer surface with an outer diameter and said outer diameter of said sleeve is at least fifty percent greater than said diameter of said outer mounting surface of said brake axle, whereby said brake adapter sleeve is mounted coaxially about said brake axle and is interposed between said brake axle and said mounting end of said brake lever arm in bearing relationship against said brake mounting base, a brake arm retainer secured to said brake axle in bearing relationship against said brake adapter sleeve to longitudinally confine said mounting end of said brake lever arm between said brake mounting base and said brake arm retainer, whereby said brake lever arm is journaled for rotation about said brake adapter.

6. A bicycle brake mechanism according to claim 5 wherein said brake axle has a central, axial, internally tapped bore defined therein and said brake arm retainer is comprised of an annular cap disposed in bearing relationship against said brake adapter sleeve and a clamping screw having a head that bears against said annular cap and a shank that passes axially through said annular clamp and is engaged in said tapped bore of said brake axle.

7. In a bicycle brake mechanism in which a brake lever arm carrying a brake pad has a mounting end mounted for rotation about a brake axle projecting out of a brake mounting base on a bicycle frame member, the improvement comprising a brake adapter formed with a cylindrical, annular sleeve having a distal end and an opposite proximal end terminating in a radially outwardly projecting bearing flange, whereby said brake adapter sleeve is mounted coaxially about said brake axle and is interposed between said brake axle and said mounting end of said brake lever arm in bearing relationship against said brake mounting base, and wherein said brake adapter sleeve has an inner diameter and an outer diameter at least greater than said inner diameter, a brake arm retainer secured to said brake axle in bearing relationship against said brake adapter sleeve to longitudinally confine said mounting end of said brake lever arm between said brake mounting base and said brake arm retainer, whereby said brake lever arm is journaled for rotation about said brake adapter.

8. A bicycle brake mechanism according to claim 7 wherein said inner diameter of said sleeve is about 8.025 millimeters and said outer diameter of said sleeve is about 13 millimeters.

9. A bicycle brake mechanism according to claim 7 wherein at least one counterbore having a diameter greater than said inside diameter of said sleeve is defined in said proximal end of said sleeve and extends distally at least part way through said bearing flange.

10. A bicycle brake mechanism according to claim 7 wherein a plurality of coaxial counterbores are defined in said proximal end of said brake adapter sleeve, and said counterbores all have diameters greater than said inner diameter of said adapter sleeve and are of decreasing diameter and increasing depth proceeding distally from said proximal end of said sleeve.

11. A bicycle brake mechanism according to claim 7 wherein said brake axle projects out of said brake mounting base a first predetermined longitudinal distance therefrom, and said brake retainer resides in bearing relationship against said brake adapter sleeve a second predetermined longitudinal distance from said brake mounting base which is greater than said first longitudinal distance.

12. A bicycle brake mechanism according to claim 11 wherein said first predetermined longitudinal distance is about 21.7 millimeters and said second predetermined longitudinal distance is about 22.7 millimeters.

13. In a bicycle brake mechanism in which a brake lever arm carrying a brake pad has a mounting end mounted for rotation about a brake axle projecting out of a brake mounting base on a bicycle frame member, the improvement comprising a brake adapter formed with a cylindrical, annular sleeve having a distal end and an opposite proximal end terminating in a radially outwardly projecting bearing flange, whereby said brake adapter sleeve is mounted coaxially about said brake axle and is interposed between said brake axle and said mounting end of said brake lever arm in bearing relationship against said brake mounting base, a brake arm retainer secured to said brake axle in bearing relationship against said brake adapter sleeve to longitudinally confine said mounting end of said brake lever arm between said brake mounting base and said brake arm retainer, whereby said brake lever arm is journaled for rotation about said brake adapter, and further comprising a thrust bearing interposed between said bearing flange and said mounting end of said brake lever arm, a thrust bearing interposed between said brake arm retainer and said mounting of said brake lever arm, and a cylindrical outer journal bearing interposed between said brake adapter sleeve and said mounting of said brake lever arm.

14. A bicycle brake mechanism for mounting on a brake axle protruding from a brake mounting base on a bicycle frame member comprising:

a brake adapter formed with a cylindrical, annular sleeve disposed coaxially about and extending distally beyond said brake axle and having an annular, radially outwardly projecting bearing flange with a distal face and an opposite proximal face that bears against said brake mounting base and said annular sleeve has an inner diameter and an outer diameter that exceeds said inner diameter by at least fifty percent, a proximal, annular thrust bearing disposed about said brake adapter sleeve and residing in bearing contact against said distal face of said bearing flange, a cylindrical, annular bearing disposed coaxially about said brake adapter sleeve, a brake lever arm having a mounting end with a cylindrical opening therethrough mounted in bearing contact with said proximal thrust bearing and coaxially about said brake adapter sleeve with said cylindrical annular bearing interposed between said brake adapter sleeve and said brake lever arm mounting end, a distal, annular thrust bearing disposed coaxially about said brake adapter sleeve and residing in bearing contact against said mounting end of said brake lever arm, and a cap secured to said brake axle and residing in bearing relationship against said brake adapter sleeve and in spaced separation from said brake axle.

15. A bicycle brake mechanism according to claim 14 wherein said brake axle has a distal end remote from said brake mounting base, and an internally tapped axial bore is defined in said distal end of said brake axle, and further characterized in that said cap has an annular configuration and further comprising a clamping screw having a head that bears against said cap and a shank that extends through said cap and is engaged in said tapped axial bore in said distal end of said brake axle.

16. A bicycle brake mechanism according to claim 14 wherein at least one axial counterbore is defined in said brake adapter where said bearing flange is formed, and said at least one counterbore has a diameter greater than said inner diameter of said brake adapter sleeve and extends at least part way through said bearing flange.

17. A bicycle brake mechanism according to claim 14 wherein a plurality of axial counterbores are defined in said brake adapter where said bearing flange is formed, and said counterbores all have diameters greater than said inner diameter of said brake adapter sleeve and said counterbores are of decreasing diameter and increasing depth proceeding axially from said bearing flange.

* * * * *